United States Patent [19]

Mavity

[11] Patent Number: 5,675,743
[45] Date of Patent: Oct. 7, 1997

[54] MULTI-MEDIA SERVER

[75] Inventor: John C. Mavity, Kinburn, Canada

[73] Assignee: Callisto Media Systems Inc., Nepean, Canada

[21] Appl. No.: 392,177

[22] Filed: Feb. 22, 1995

[51] Int. Cl.$^6$ .................................................. G06F 15/173
[52] U.S. Cl. ........................ 395/200.15; 395/200.02; 395/280
[58] Field of Search ..................... 395/700, 650, 395/600, 280, 306, 200.01, 200.02, 200.09, 200.15, 200.17, 853, 281, 800, 200.03; 348/7

[56] References Cited

U.S. PATENT DOCUMENTS

| | | | |
|---|---|---|---|
| 4,975,833 | 12/1990 | Jinzaki | 395/479 |
| 5,113,496 | 5/1992 | McCalley et al. | 395/306 |
| 5,142,638 | 8/1992 | Schiffleger | 395/478 |
| 5,353,415 | 10/1994 | Wolford et al. | 395/306 |
| 5,369,748 | 11/1994 | McFarland et al. | 395/306 |
| 5,394,526 | 2/1995 | Crouse et al. | 395/200.01 |
| 5,396,485 | 3/1995 | Ohno et al. | 370/16 |
| 5,410,343 | 4/1995 | Coddington et al. | 348/7 |
| 5,410,656 | 4/1995 | King et al. | 395/306 |
| 5,440,693 | 8/1995 | Arnold et al. | 395/284 |

*Primary Examiner*—Glenn A. Auve
*Attorney, Agent, or Firm*—Foley & Lardner

[57] ABSTRACT

A data server for enabling the delivery of data information from any storage device containing said data and an external port requiring the data is disclosed. The server is comprised of a plurality of basic building blocks, each consisting of a first processing element connected to a second processing element via an inter-processing element bus to form a server plane. Each inter-processing element bus connects two processing elements in such a way that every processing element in a server plane is connected to every other processing element in the same server plane, via an independent inter-processing element bus. A plurality of sub-busses, each having input/output devices connected thereto are connected to the inter-processing element bus. Each input/output device is accessible by each processing element in such a way that the maximum transit distance required to access an input/output device of one sub-bus from an input/output device of another sub-bus is equal to the transit distance between two processing elements. All server planes have full access to all input/output devices such that the loading of the processing elements and the inter-processing element busses of one server plane is independent of activity on processing elements and the inter-processing element busses of any other server planes.

12 Claims, 9 Drawing Sheets

MULTI-MEDIA SERVER

SUMMARY OF THE INVENTION

This invention relates to multi-media (audio, video, computer data) servers, but more particularly to a multi-media server adapted to provide on-demand access to a data library.

BACKGROUND OF THE INVENTION

The advent of new satellite delivery systems and the entry of the telephony service providers into the data delivery market is resulting in an unprecedented level of development in the lucrative multi-media entertainment market.

Work is underway to find opportunities for product differentiation and enhancement over the currently available broadcast services. For example, instead of subscribers having to accept the material selected by the video service provider, as is now the case, future subscribers will personally control both the selection and the timing of presentation. The cable and telephone companies are gearing up to provide competing "on-demand" and "enhanced" multi-media services to their subscribers.

In order to support this on-demand orientation arising out of the metamorphosis of the multi-media market, all players, whether satellite, cable, or telephone companies, require the ability to deliver programming material over thousands of delivery trunks to their subscribers. Consequently, they must also offer a very large library of multi-media material for the subscribers' selection. Due to the large number of resulting end user selections, it is mandatory that the selection and delivery system be fully automated.

Although there is a great deal of effort being applied to the development and deployment of delivery systems, a suitable multi-media library system does not appear to be available yet.

Ideally, a data server should be able to selectively provide on-demand access to a library of video, audio and/or computer data upon the request of a subscriber. In order to be effective, and competitive with existing video rental services, each subscriber should be able to interactively control the data received. For example, the subscriber should be able to use VCR commands such as stop, pause, fast forward or rewind while reviewing the program material being received.

Functionally, the server receives search commands from the subscriber, locates the requested information in a storage device, transfers the information to a suitable interface and dispatches it over a predetermined transmission medium to the subscriber's television or computer.

The on-demand delivery of a large variety of program material can only be provided if the server system has a large number of storage devices, a large number of simultaneous access trunks, multiple load sharing access to all devices, very high, aggregate internal, and processing, bandwidth.

The need for a large number of storage devices cannot be underestimated. For example, a selection of 10,000 titles, each 2 hours in length at video standard quality, would require over 36 Terabytes of storage. In addition, to provide the service to, say, 70,000 viewers, 70,000 video streams or channels would be required. This amount of information transfer would require a bandwith of 280 Gigabits/sec.

Existing data servers cannot provide service of this magnitude with a single system.

DESCRIPTION OF THE PRIOR ART

The current data server platforms use large mainframes to process incoming subscriber requests and to transfer data to and from large storage devices. The existing servers require high bandwidth ATM (Asynchronous Transfer Mode) switches because each subscriber requires a dedicated data channel or stream. Providing 70,000 video streams @4 Mbits/sec (an MPEG-II video standard) requires a 280 Gigabits/sec switching capacity. Thus, not only does the service provider require the use of an expensive data server, but the service provider must also have access to, and pay the additional costs of providing, high capacity ATM switches.

Also, existing data server platforms are limited by their fixed-bandwidth internal busses. Each time a port is added to service more subscribers, the system gets nearer its maximum servicing capacity. Once the server has reached its maximum servicing capacity further expansion will require the addition of external switching capacity and the duplication of library material.

Accordingly, a need exists for an enhanced data server which can provide quick, multiple access to program material at the subscribers' request. Such a device must have a flexible architecture to allow it to meet the many, changing demands of this emerging market. Specifically, it must be highly scalable to allow fielded units to grow with the market.

SUMMARY OF THE INVENTION

It is therefore an object of the present invention to provide an enhanced data server which makes use of a distributed architecture in conjunction with high capacity and quick, multi-access storage devices to provide storage and retrieval of large quantities of digital data and which is able to support from one to hundreds of thousands of simultaneous subscribers.

Another object of the present invention is to provide an enhanced data server which is based on scalable processing elements interconnected over redundant and independent load-sharing data paths. Each data path provides access to multiple input/output devices such that any one of a pair of processing elements can access any one of the input/output devices connected thereto.

Another object of the present invention is to provide an enhanced data server which automatically and dynamically adjusts the storage of data within a hierarchical storage system comprised of single stream storage devices such as tape and CD-ROMs and multi-stream storage devices such as disk and RAM.

Another object of the present invention is to provide an enhanced data server wherein every processing element is connected to every other processing element via an independent inter-processing element bus.

Another object of the present invention is to provide an enhanced data server wherein two or more sets of processing elements, complete with a full set of independent inter-processing element busses to form a server plane and wherein the inter-processing element busses are connected to a set of sub-busses such that all server planes have full access to all sub-busses and such that the loading of the inter-processing element busses of one server plane is independent of activity on all other server planes.

In accordance with a first embodiment of the invention, there is provided a data server for enabling the delivery of data information from any storage device containing said data to an external port requiring the data, comprising:

a first processing element connected to a second processing element via an inter-processing element bus, each inter-processing element bus connecting two processing elements in such a way that every processing element is connected to every other processing element via an independent inter-processing element bus; and input/output devices connected to the inter-processing element bus, each input/output device being accessible by each processing element in such a way that the maximum transit distance required to access an input/output device of one inter-processing element bus from an input/output device of another inter-processing element bus is equal to the transit distance between two processing elements.

In accordance with a second embodiment of the invention, there is provided, in a data server having data information stored in storage devices and having external ports for delivering said data information, a method of enabling the delivery of said data from any storage device to any external port, comprising the steps of:

connecting a first processing element to a second processing element via independent inter-processing element busses each set of processing elements forming a server plane; and connecting input/output devices to said independent inter-processing element busses such that each processing element can access anyone of said input/output devices, independently of an other processing element.

BRIEF DESCRIPTION OF THE DRAWINGS

The invention will be better understood by an examination of the following description, together with the accompanying drawings, in which.

DESCRIPTION OF THE PREFERRED EMBODIMENTS

Figure 1:
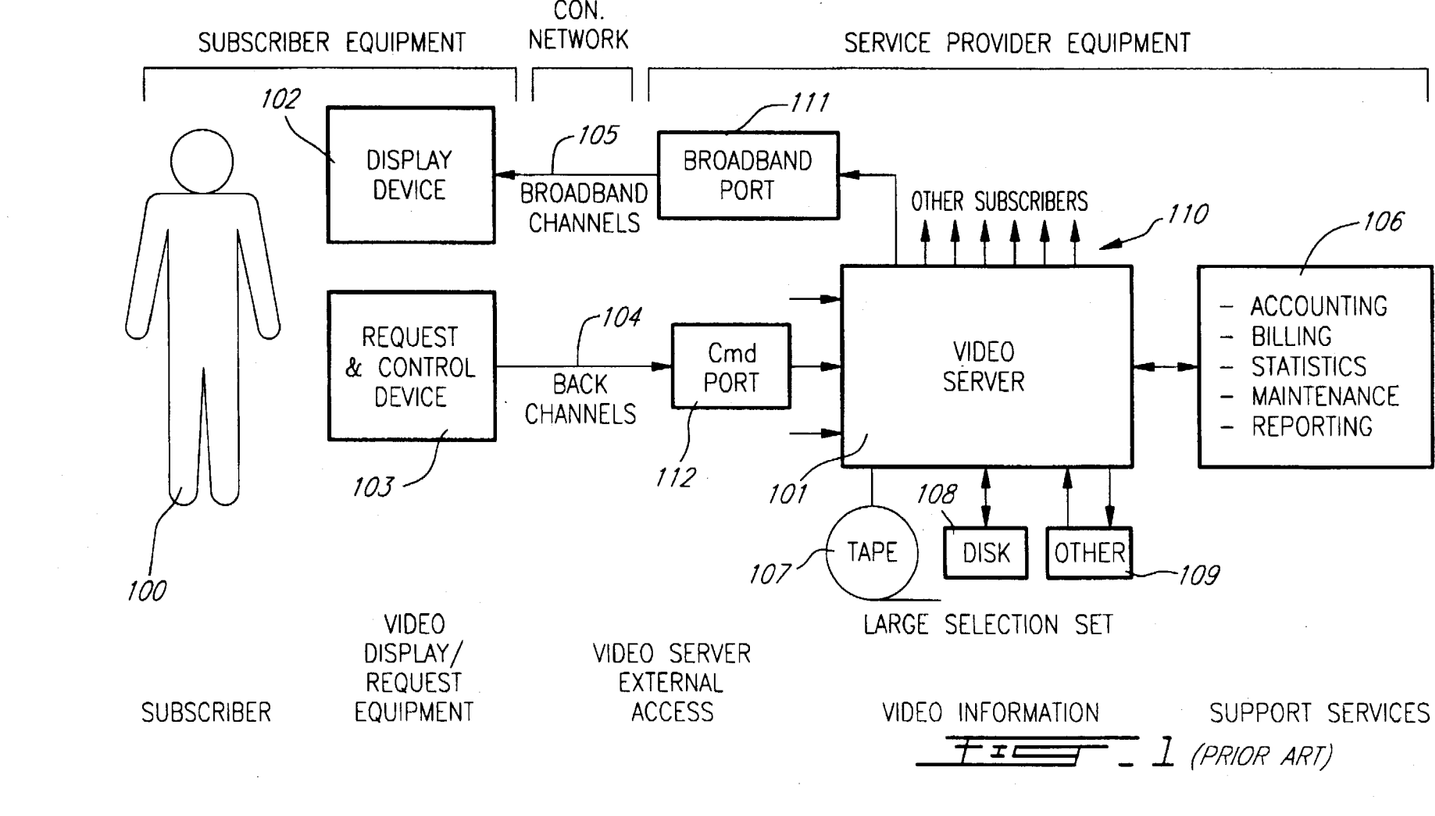
FIG. 1 is a block diagram illustrating an application of a data server.

Referring now to FIG. 1, we have shown a block diagram illustrating the basic building blocks necessary to provide data on demand to a subscriber 100. The components necessary to provide data on demand can be separated into three categories: a) the subscriber equipment, which is located on the subscriber's premises; b) the service provider's equipment located at the provider's premises; and c) the communication network linking the subscriber and service provider.

The subscriber 100 requires the necessary equipment to interact with a data server 101. This equipment includes a display device 102 (if video data is requested) and a request and control device 103. The display device 102 can consist of a television set or a computer with video display. The request and control device 103 can consist of a CATV remote control which permits remote access to the server or a control device connected to the server via a telephone network. For example, a subscriber could access the server via a standard 'touchtone' telephone, by following instructions provided by an Interactive Voice Response system. Similarly, access could be achieved using a modem and the above referenced computer.

The communication network 104 from the subscriber end to the service provider end can consist of a telephone line or a return control channel of a standard CATV network. In the case of the communication network 105 from the service provider to the subscriber, a delivery medium suitable to carry broadband channels is required. For example, either the standard CATV network or a telephone network infrastructure capable of carrying a broadand signal would be required. In some environments, the ability to provide access to the server via a radio link may be required.

Other than providing a data server 101, the service provider has to provide support services 106, which includes the tracking of usage of the server by each subscriber. This includes a number of functions, for example, accounting, billing, statistics, maintenance and reporting. Although these function do not necessarily define the operational features of the server, the collection of statistics may be useful in determining the preferred programming choice of certain subscribers. Similarly, statistical results may be useful in providing price vs. demand information.

The main element of the service provider's equipment is the data server 101. The data server accesses data from a number of storage devices including large capacity tape drives 107, disk drives 108 and/or other data sources 109. Delivery of the data is achieved using a number of trunks 110, each connected to a broadband port interface 111. The subscriber's requests are received via a number of command port interfaces 112.

Figure 2:
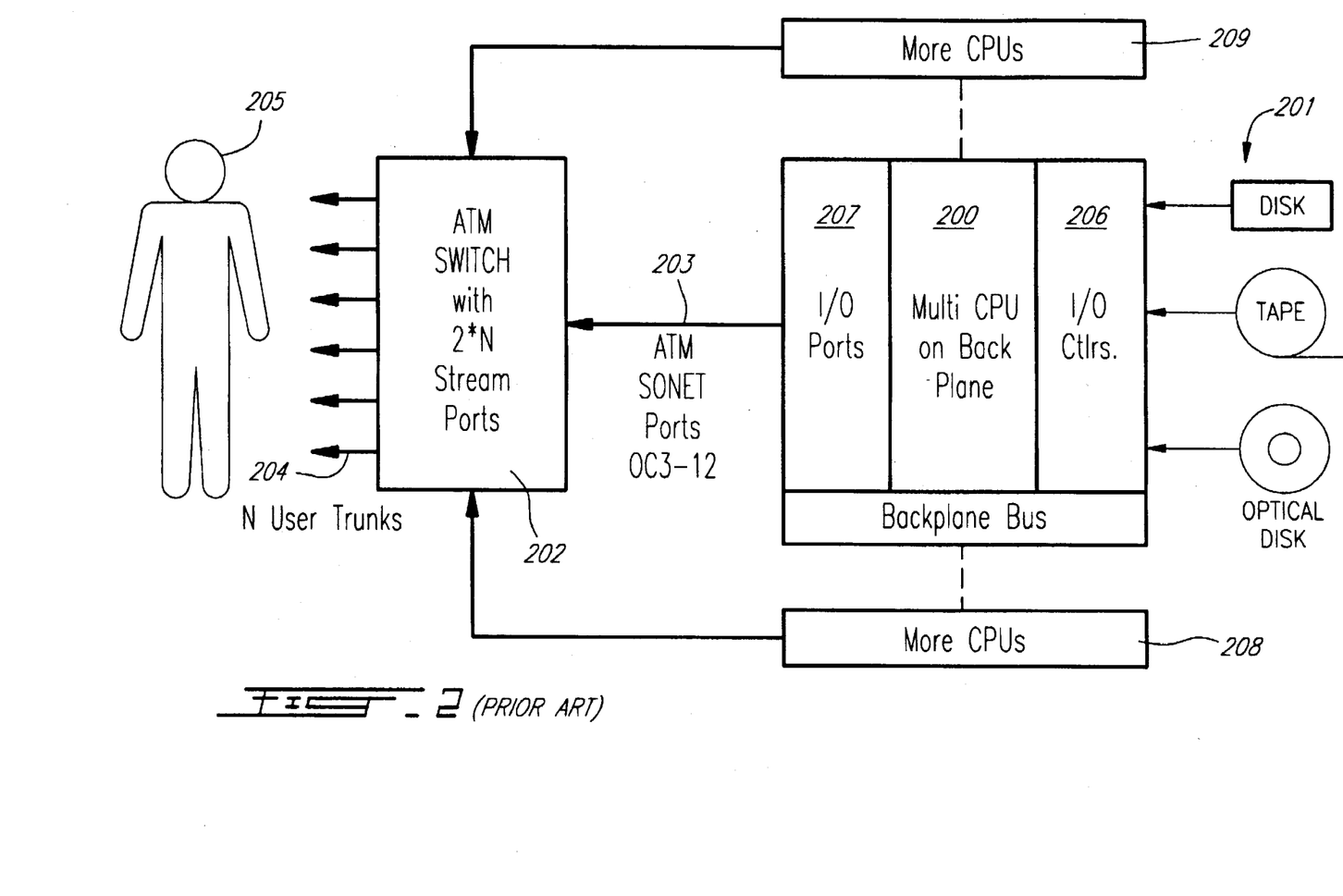
FIG. 2 is a block diagram of a prior art data server.

Previous attempts at providing data on demand required the use of large capacity processors combined with large storage devices and high capacity Asynchronous Transfer Mode (ATM) switches. Such an approach is shown in FIG. 2. With this approach, a centralized mainframe computer 200 with access to storage devices 201 is connected to an ATM switch 202 via OC3 type trunks. Since each user requires an independent channel, one user port 204 is assigned for each subscriber 205. A mainframe computer 200 and high capacity switch 202 is required since all subscriber requests and data are routed via the mainframe 200, trunks 203 and ATM switch 202. It is therefore easy to see that as the number of subscriber increases, the physical limits of the system's architecture are reached. The main limiting hardware being the input/output controllers 206, input/output ports 207 and OC3 trunks 203. When the operational limits of the mainframe is reached, more units 208 and 209 have to be provided. However, with each additional mainframe, a number of duplicate storage devices 201 also have to be added to each mainframe since access to those storage devices can only be done via the mainframe. Then, as more mainframes and storage devices get added to the system, the ATM switch's maximum handling capacity is quickly reached.

Figure 3:
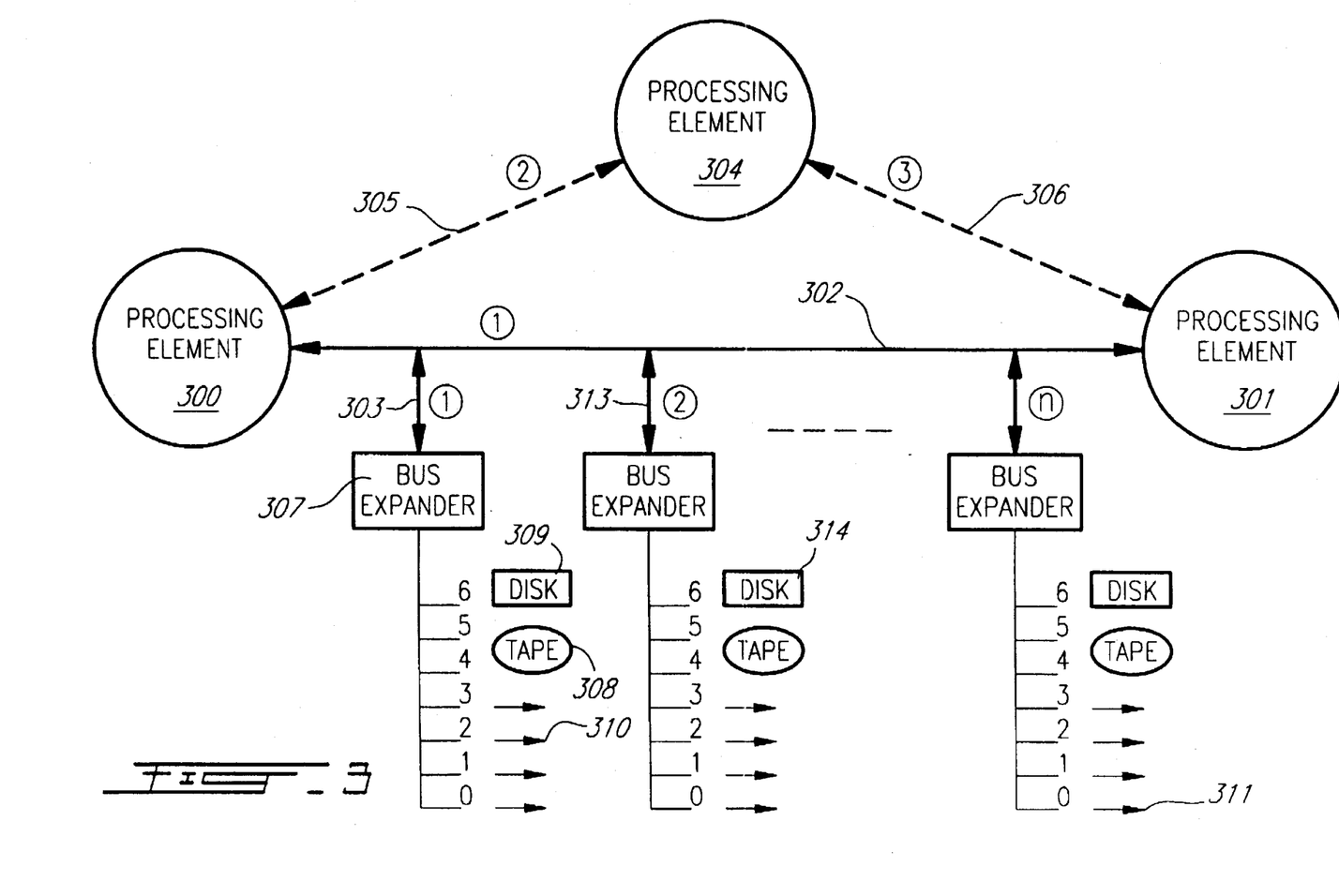
FIG. 3 is a block diagram illustrating the enhanced data server according to one aspect of the present invention.

The problems of these prior art platforms are eliminated by the data server architecture of the present invention. The basic building block of a data server according to a first embodiment of the present invention is shown in FIG. 3.

With the server of the present invention, a first processing element 300 is connected to an adjacent processing element 301 via an independent inter-processing element bus 302. The inter-processing element bus allows each processing element 300 and 301 to access any one of a number (1–n) of sub-busses 303 independently of the other processing element. If a third processing element 304 is to be added, two additional inter-processing element busses 305 and 306 would be added such that every processing element is connected to every other processing element via an inter-processing element bus. Each new inter-processing element bus will have its associated number (1–n) of sub-busses. The inter-processing element bus carries information in the form of data packets which are time multiplexed for delivery of data from various sources. The embodiment of FIG. 3 illustrates the concept of a 'server plane', wherein 2 or more sets of processing elements and a full set of independent inter-processing element busses are connected.

Each sub-bus 303 has the necessary input/output devices to enable access and retrieval of data requested by a subscriber. It is to be noted that on a smaller system, the input/ouput devices may be connected directly to the inter-processing element bus. These include single stream devices, such as tape, CD-ROM, etc. and multi-stream devices such as disks (including RAID (Redundant Arrays of Independent Disks)), RAM (Random Access Memory), etc. On a larger system, a bus expander 307 is used on each sub-bus 303 to accommodate multiple input/output devices and ports. For example, each sub-bus includes large capacity tape drives 308, disk drives 309 for quick, multiple access of stored information, and multiple output ports 310. In the preferred embodiment, SCSI sub-busses are used to accept multiple SCSI devices.

Although storage devices are shown connected to each sub-bus along with output ports, information stored on, say, disk 309 will not necessarily be retrieved and transmitted on an output port located on the same sub-bus 303. This is one of the advantages of using the data server architecture of the present invention. That is, the data server architecture of the present invention allows the delivery of data between any storage device and any output port. As an example, a subscriber connected to output port 0 shown at reference numeral 311 of sub-bus n can retrieve data located on tape drive 312 of sub-bus 313. Similarly, if the data is only available on a sub-bus (not shown) connected to inter-processing element bus 305, then the subscriber's requested data will be routed, on inter-processing element bus 305, then on inter-procesor bus 302 via processing element 300, onto sub-bus n and finally out through output port 311. A buffer device, such as a First-In-First-Out (FIFO) buffer can be used to provide a smooth flow of data to the subscriber. For example, if the data comprises packets of digital video information, then the buffer provides a smooth output of data to the subscriber. The particular process for retrieving the requested data will be described in further detail below.

Figure 4:
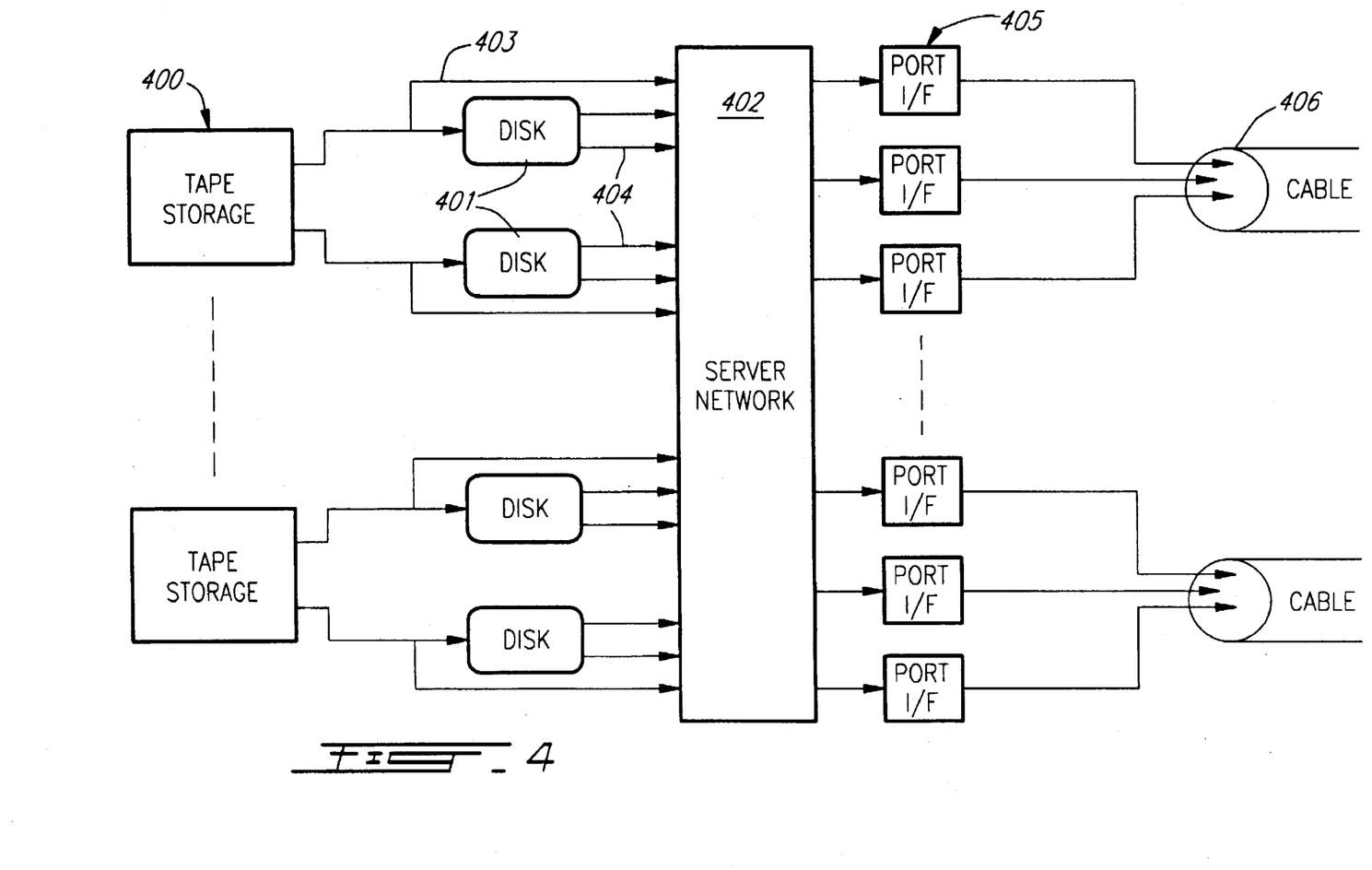
FIG. 4 illustrates the delivery of data information from hierarchical storage devices to subscribers according to the embodiment of FIG. 3.

Referring now to FIG. 4, we have shown the process of delivering data from hierarchical storage devices to the subscriber's delivery trunks. The advantage of using a hierarchical storage system is that large capacity tape storage hardware is currently too expensive (per access stream) and too slow for direct access and control by a subscriber. On the other hand, although disk devices have fast access rates, they are too expensive to store the required quantities of data required for a data server. In the preferred embodiment, the primary data storage resides in tape carousels 400. For example, a single 4 mm DDS-II tape unit can simultaneously load and access any four of sixty 4 Gigabyte tapes. Various other carousel units are available and can be used as storage devices for the present invention. Each sub-bus (shown in FIG. 3) can carry one or more tape carousels depending on the sub-bus bandwidth capacity.

The selected data automatically migrates to a pool of disk cache devices 401 to allow multiple access and delivery of enhanced user services. A number of 9 Gigabyte SCSI-II disk drives can be used for this purpose. Higher capacity disk drives can of course be used as they become available. At any given time the quantity and type of data stored on disk is dynamically adjusted to reflect the subscribers' requests. Direct links 403 are used to transfer data from a tape storage device 400 to a disk located elsewhere on the server network. For example, in situations where the requested data is only available on a tape located elsewhere and not directly accessible by a delivery port. However, in the majority of cases, a processing element can be chosen so that a single processing element can read the requested data and directly write it to the desired external port. Disk cache links 404 are equivalent to disk storage ports 6 shown in FIG. 3.

The server fabric 402 represents the cluster of processing elements 300, 301 and 304, shown in FIG. 3, forming the data server network. Thus, a first group of tape and disk storage devices located on a first inter-processing element bus may be accessed to deliver data to any one of the external port interfaces 405. The inter-processing element busses are not shown in FIG. 4, since they form part of the cluster of processing elements which are interconnected via the inter-processing element busses.

In the case of a video signal transmitted to a subscriber either via CATV or telephone network, each external port interface 405 is associated with a television channel, either digital or analog. Multiple channels are then bundled and distributed via a cable 406 to a region of the service area.

Figure 5:
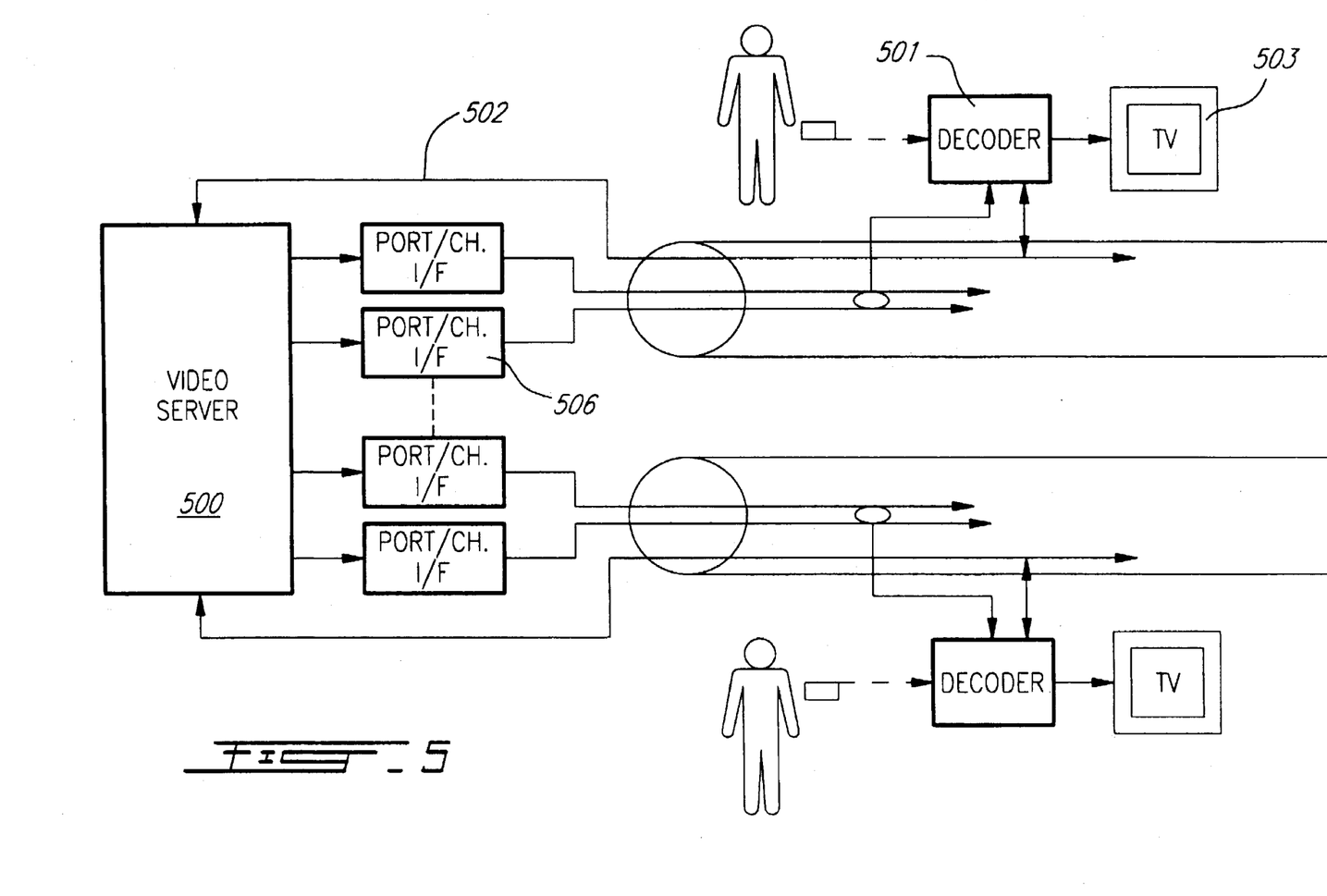
FIG. 5 is a block diagram illustrating the connection of the data server of the present invention to a subscriber.

FIG. 5 is a block diagram illustrating the connection of the data server of the present invention to video subscribers. When a subscriber desires a video program from the data server 500, the subscriber is first connected to the data server via a request/control channel 502 and then a request is sent from the subscriber's premises via a decoder box 501. The request/control channel 502 allows the subscriber to access programming menus from his/her television set 503. At this point of the selection process, the subscriber is actually interfaced with one of the processing elements. As will be described later, the selection process involves a number of steps and actions by each element of the system.

Once the selection process is complete, the selected video program is sent via port/channel interfaces 506 to a subscriber's equipment via a predetermined transmission path.

Figure 6:
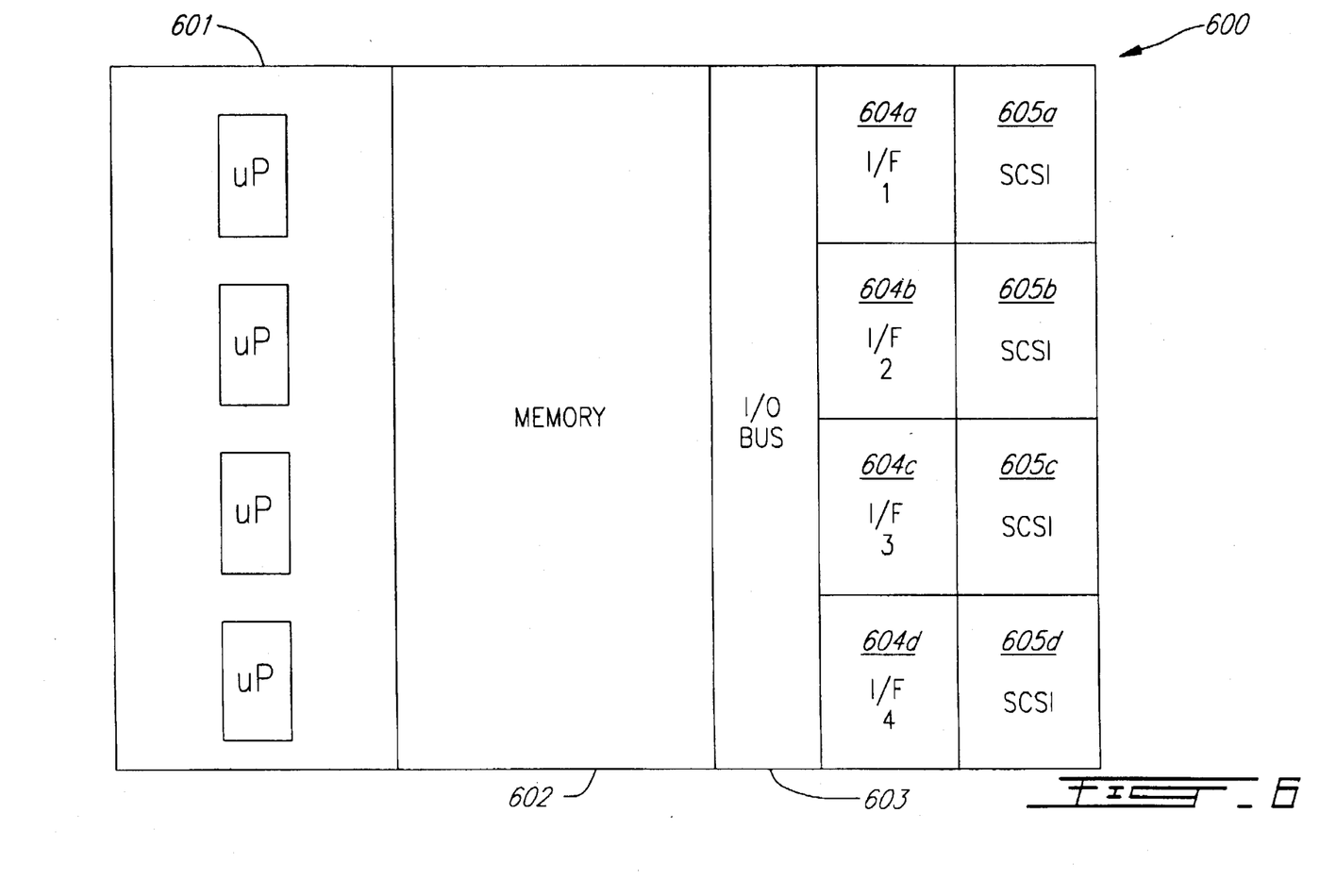
FIG. 6 is a block diagram of a processing element which can be used with the embodiment of FIG. 3.

FIG. 6 is a block diagram of a processing element layout 600 that can be used for the data server embodiment of FIG. 3. The processing element 600 is comprised of multiple processors 601 to enable interactions between a subscriber and a data menu, as well as provide the necessary operation of data server. A large memory 602 is used to store instructions, data server menus, etc. A processor input/output bus 603, interfaces 604a–d and SCSI ports 605a–d allow the interface between the processor and various elements external of the processing element. Each SCSI port is connected to an inter-processing element bus to access any one of a number of sub-busses connected thereto (see FIG. 3). Since processing elements are connected to each other via an inter-processing element bus, each processing element, in the embodiment of FIG. 3, makes use of 2 pairs of SCSI ports. As will be shown further below, additional SCSI ports can be added to accommodate expansion to additional processing elements. It will be known to those knowledgeable in the art that other transport technologies can be used instead of SCSI busses. For example, a fiber bus connected to the I/O ports could also be used.

Figure 7:
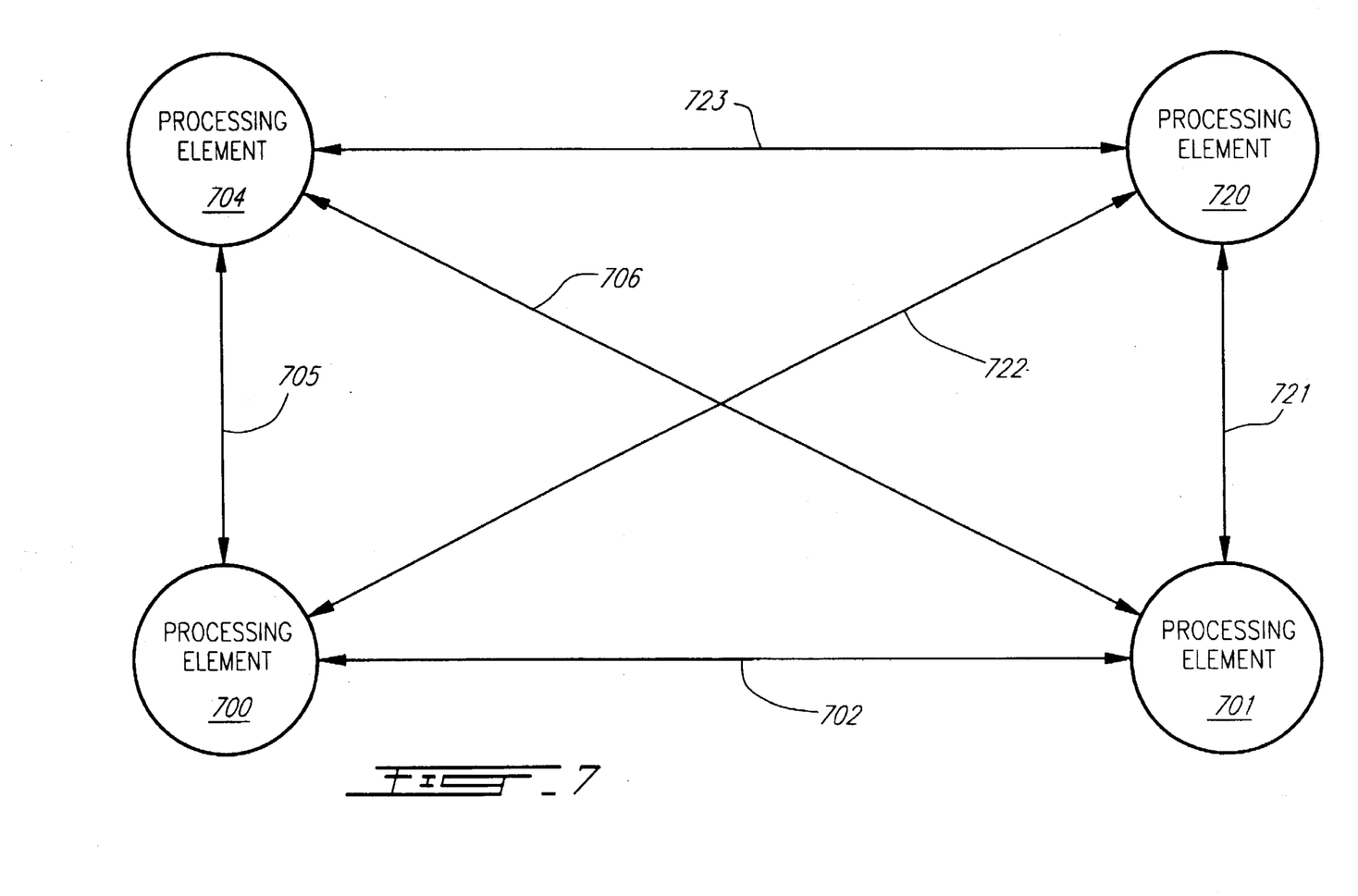
FIG. 7 illustrates the scalable feature of the data server of the present invention.

If we now make reference to FIG. 7, we can illustrate the scalability feature of the data server of the present invention. As is illustrated, the addition of a fourth processing element more than doubles the number of inter-processing element busses available for use by storage devices and subscriber ports. For example, if processing elements 700, 701 and 704 correspond to processing elements 300, 301 and 304 of FIG. 3, respectively, and inter-processing element busses 702, 705 and 706 correspond to busses 302, 305 and 306 of FIG. 3, then the addition of a fourth processing element 720 doubles the number of inter-processing element busses now available to service subscribers and additional storage devices. The increase in the number of inter-processing element busses can be described by the following equation:

$$S = \frac{n(n-1)}{2}$$

wherein

S is the number of inter-processing element busses; and
n is the number of processing elements in the server network.

Thus, in FIG. 7, three additional inter-processing element busses, 721, 722 and 723 are required in order to connect each processing element to every other processing element. With the addition of another processing element, each processing element is provided a third pair of SCSI ports to accommodate a third inter-processing element bus connection between each processing element. As can be seen from FIG. 7, additional sub-busses carrying storage devices and external ports to subscribers can easily be accommodated. By providing sub-busses on each inter-processing element bus, any processing element associated with the inter-processing element bus can independently access the data required. Also, if the data is not available on one shared inter-processing element bus, the maximum transit distance required to access, say, a storage device on any other inter-processing element bus from any input/output port is equal to the transit distance between two processing elements. That is, let's assume that a subscriber, connected to a sub-bus on inter-processing element bus 702, requires data which is only available on a storage device located on a sub-bus of inter-processing element bus 723, then the data can be transferred via any one of the following routes:

a) processing element 720, inter-processing element bus 721 and processing element 701;

b) processing element 720, inter-processing element bus 722 and processing element 700;

c) processing element 704, inter-processing element bus 706 and processing element 701; or d) processing element 704, inter-processing element bus 705 and processing element 700.

Thus, the maximum transit distance required to provide the selected data to the subscriber requesting it is never greater than the transit distance between any two processing elements. As indicated earlier, in the majority of cases, a processing element can be chosen so that a single processing element can read the requested data and directly write it to the desired external port.

Figure 8:
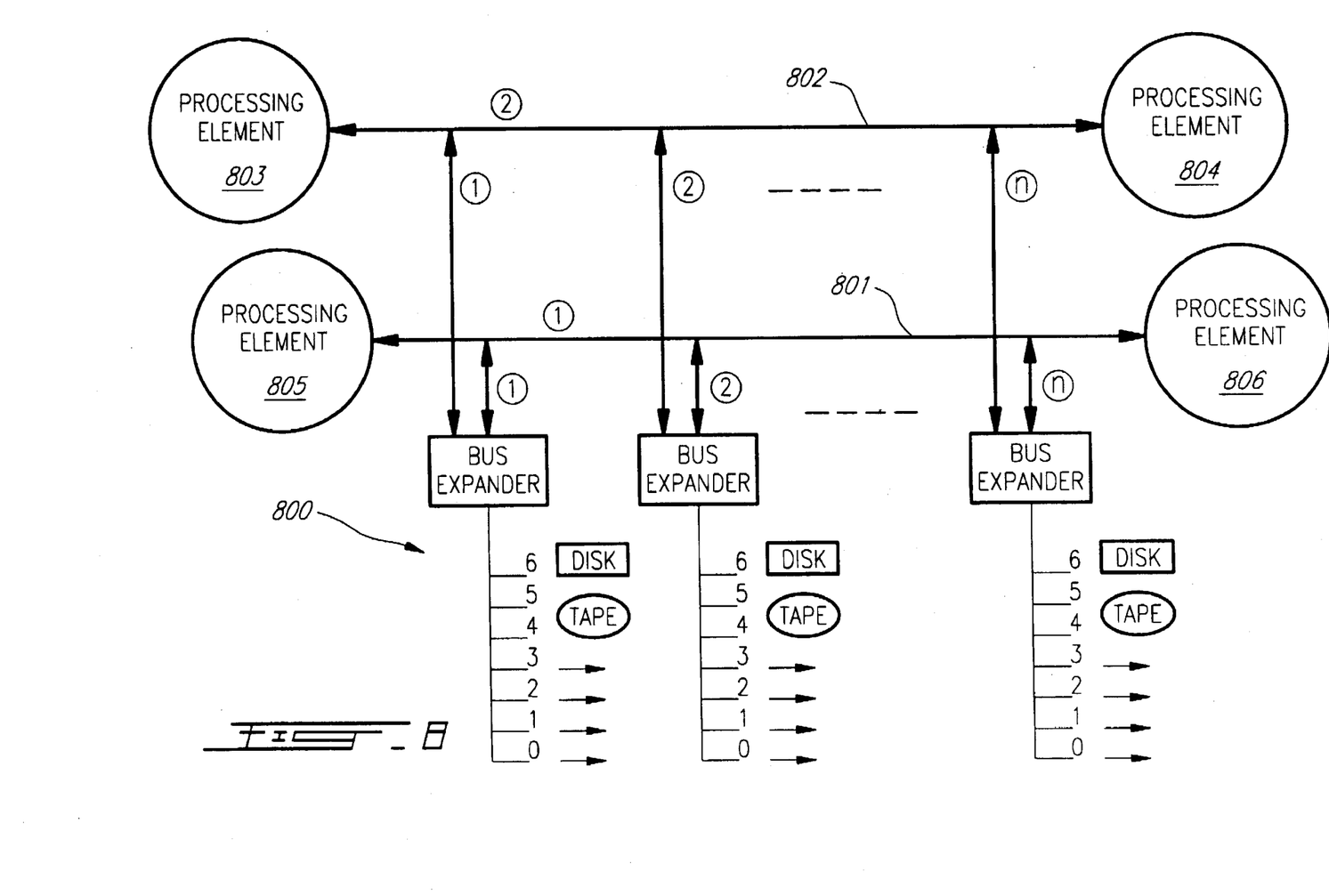
FIG. 8 is a block diagram of an enhanced data server according to another embodiment of the present invention.

Referring now to FIG. 8, we have shown a load sharing data server network, wherein each sub-bus 800 is shared by two inter-processing element busses, shown at reference numerals 801 and 802. In this arrangement, the same sub-bus input/output devices are shared directly by four processing elements, instead of two. A first server plane is formed with processing elements 803 and 804 and inter-processing element bus 802. A second server plane is formed with processing element 805 and 806 and inter-processing element bus 801. Each independent inter-processing element bus is connected to sub-busses 800 such that all server planes have full access to all sub-busses. With this arrangement, the loading of processing elements and the inter-processing element busses of one server plane is independent of activity on any other server planes. That is, if a subscriber request is received at, say, processing element 805, the request will be processed via inter-processing element bus 801 to and from any of the input/output devices of the attached sub-busses, but independent of any activity taking place between another subscriber connected to, say, processing element 803 and accessing the input/ouput devices which are also attached to inter-processing element bus 802.

This arrangement allows the use of a larger number of I/O devices than one inter-processing element buss would normally accept. With the use of a bus expander, the loading bandwith is split before it reaches the inter-processing element busses.

We will now describe the operation of the invention, first with reference to FIG. 5. A provider of data library services can provide the service to subscribers having the necessary equipment to decode the incoming data. In the case where video information is send via CATV to the subscriber, a decoder 501 is used, by the subscriber. In the illustration of FIG. 5, the subscribers make use of the decoder 501 to receive information and send requests. As indicated earlier, it is also possible for a subscriber to dial in their requests via a low bandwith service, such as the telephone network, short wave radio, etc.

When a subscriber desires a video program from the video server 500, the subscriber would first pick a selection from a menu of video programs contained in the server's library. This first interaction between the customer and the service provider can either be done at one of the processing elements, or a separate computer which maintains a list of video program menus. The goal is to allow the subscriber to make a selection from his television 503 or computer (not shown), via controlling hardware and the decoder 501. A return or back channel can be made available on the subscriber's cable link 502 to enable this interaction. The requests are sent from the subscriber's premises via a decoder box 501. Once the subscriber has accepted the selection, the request is enabled by the server 500.

Figure 9:
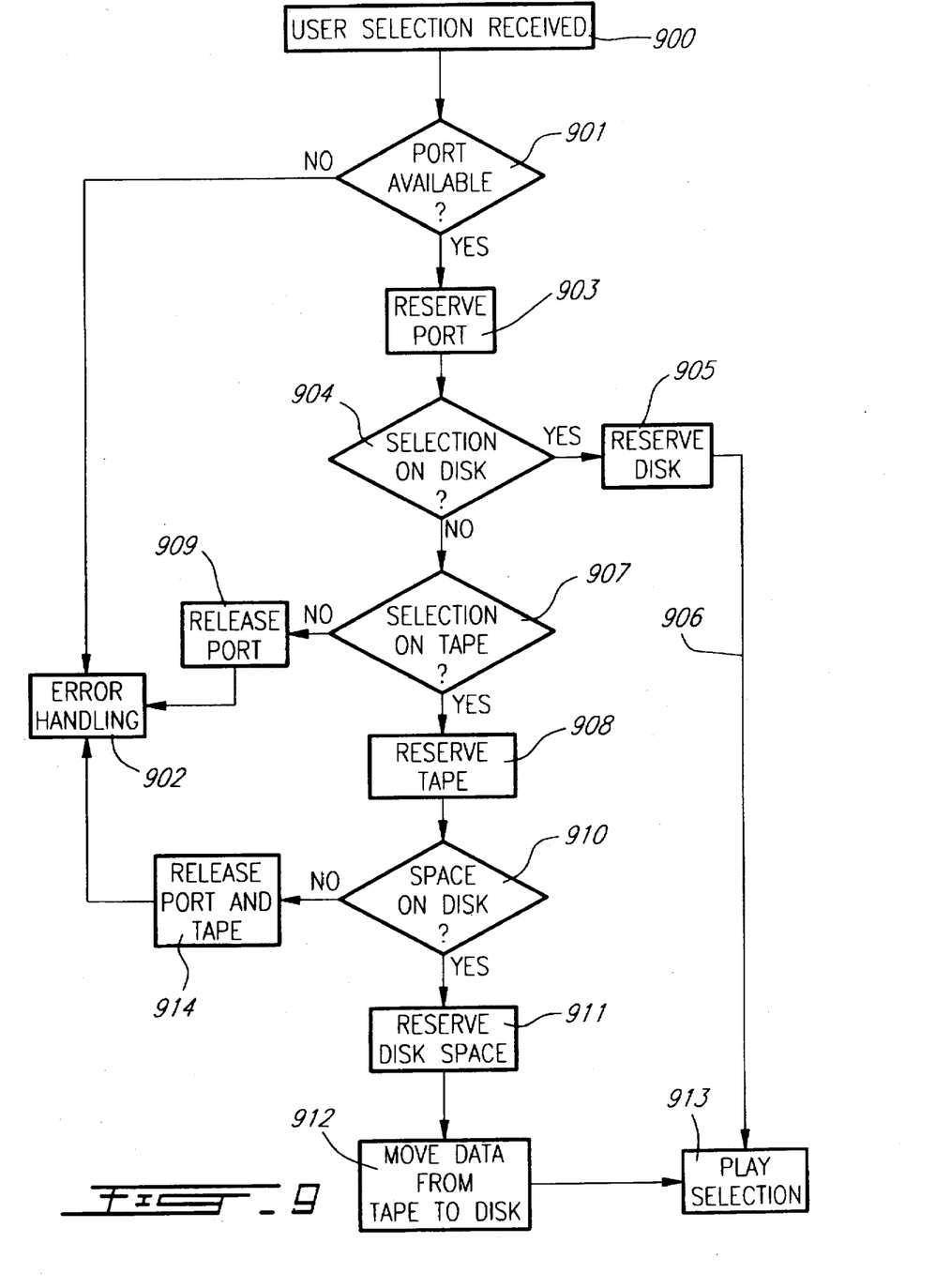
FIG. 9 is a flow diagram illustrating the transfer of data from a storage device to a subscriber.

As shown in FIG. 9, once the user selection is received at box 900, the server then determines, at box 901, whether a port 506 is available to reach the subscriber's home. If no port is available, the server enables an error handling routine 902 which would inform the subscriber of the unavailability of a port. The service provider can of course determine the type of message which would be delivered to the subscriber. Since a video port 506 is not available, this message would be sent to the subscriber on the control or back channel 502. If a port is available, the server would reserve a port, box 903, and determine at 904 if the selection is available on a disk. As shown in FIGS. 3 and 4, each processing element has access to every disk, such as disk 309 in FIG. 3 and disk 401 of FIG. 4, either directly or via an adjacent processing element. The disk having the selection is then reserved, box 905, and the subscriber's selection can immediately be sent, line 906, to the subcriber via the port which was reserved at 903. As indicated previously, because a disk has a quick access speed, a disk containing a video program can provide real-time control to a subscriber. At the subscriber end of the network, the decoder 501 would automatically change channel or force tune the television to a predetermined channel to provide the subscriber with the selected program.

As shown in FIG. 9, at box 904, if the selection is not on any disk, then the server attempts to find the selection on a tape, box 907. Since the processing elements also have access to all tape storage devices, each processing element can determine if the subscriber's selection is available on tape. If, in a multi-processing element system, the selection is not on a tape of an inter-processing element bus common to that processing element, a request is sent to adjacent processing elements to look for the selection. Only those processing elements that have access to the selection available on tape reply to the request. If the selection is available, it is reserved, at box 908. If not, the port reserved at box 903 is released at box 909 and a message is sent to the subscriber informing him of the unavailability of the selection.

If the requested information is available on tape, it then has to be transferred to a disk for the subscriber to access. Thus, as shown at box 910, a determination is made of the availability of space on a disk. If a disk is available which has sufficient memory and bandwith to store the requested information, then it is reserved at box 911 and the data is moved, box 912, from the tape to a location reserved on the disk. The selection can then be sent, box 913, to the subscriber. If disk space or bandwith is not available, then both the reserved port and reserved tape selection must be released, box 914. Although a disk may have sufficient space to store another movie, if the disk has reached it maximum number of users, it won't be able to access the newly stored data which has been transferred from tape.

The transfer of the selected information can be described in conjunction with FIGS. 3 and 9. In particular, the server network makes use of device addresses to locate a particular selection from any storage devices and also to identify an available output port. When the user selection is received, box 900, at one of the processing elements and a port selected on sub-bus 303, box 903, the processing element needs to determine the address of an available port. If port 310, for example, is the selected port on sub-bus 303 of inter-processing element bus 302, then it's network address is at location (1,1,2). That is, inter-processing element bus #1, sub-bus #1 and port #2. Similarly, if the selection exist on disk 314 of sub-bus 313, then the disk's location can be found at address (1,2,6). The processing elements would thus instruct the disk at location (1,2,6) to read the content of it's memory address containing the selection. Since the disk can obviously be accessed for more than one request, the information is read in blocks and sent in packets on the inter-processing element bus 302 and to the processing element serving the subscriber. Since, as indicated earlier, the data is transferred on inter-processing element bus 302 in packets which are time multiplexed, a random access memory is used to buffer the packets before sending them to the selected port, i.e. (1,1,2) in this example. A FIFO buffer is then used at the port to smooth the flow of data suitable for delivery to the subscriber.

I claim:

1. A distributed and scalable data server for enabling the delivery of digital data from any storage devices containing said digital data to interface data ports for interfacing said data server with external data distribution or processing media capable of processing the delivered data, said data server comprising:

a network of processing elements having an independent element bus disposed between any pair of said processing elements such that each processing element in said network is connected to every other processing element via an independent inter-processing element bus, each independent inter-processing element bus operating asynchronously to the processing elements such that each processing element in said network is presented with an independent data delivery path between itself and every other processing element of said network; and each storage device and interface data port being connected to at least one said independent inter-processing element bus such that each of said storage device and interface data ports is independently accessible by any processing element in said network such that the maximum transit distance required to access a storage device on one said independent inter-processing element bus from an interface data port on another said independent inter-processing element bus is limited to two processing elements.

2. A data server as defined in claim 1, wherein said storage devices include a number of hierarchical storage devices for storing said data.

3. A data server as defined in claim 2, wherein said hierarchical storage devices comprise single-stream storage devices and multi-stream storage devices, said single and multiple-stream storage devices being connected on said inter-processing element busses such that data information can be transferred from one of said single-stream storage device to any one of said multi-stream storage devices via an inter-processing element bus, said hierarchical storage devices being configured to move data between said single and multiple stream storage devices concurrently with the delivery of data to said interface data port.

4. A data server as defined in claim 2, wherein each said inter-processing element bus is provided with a bus expander to enable the connection of multiple storage devices and interface data ports thereto.

5. A data server as defined in claim 1, wherein a network of processing elements connected via independent processing element busses form a server plane.

6. A data server as defined in claim 5, wherein a first server plane can share storage devices and interface data ports with a second server plane via independent inter-processing element busses extended to connect said first server plane to said second server plane such that all server planes have full access to all the storage devices and interface data ports, and access to each processing element and inter-processing element bus of one server plane is independent of activity on processing elements and the inter-processing element busses of any other server plane.

7. A data server as defined in claim 6, wherein said data comprises video information.

8. In a distributed scalable data server having digital data stored in storage devices and interface data ports interfacing said data server with external data distribution or processing media capable of processing data received form said data server, a method of enabling delivery of said digital data from any storage device via any interface data port, comprising the steps of:

connecting each processing element in a network of processing elements to each other via independent inter-processing element busses, an independent inter-processing element bus being disposed between each pair of said processing elements in said network, each network of said processing elements forming a first server plane;

operating said independent inter-processing element busses asynchronously of said processing elements; and connecting said storage devices and said interface data ports to said independent inter-processing element busses such that each said processing element can access any one of said storage devices or said interface data ports, independently of any other said processing element.

9. A method as defined in claim 8, further comprising the step of sharing said storage devices and interface data ports with a second server plane via independent inter-processing element busses extended between said first server plane and said second server plane, such that all server planes have full access to all storage devices and interface data ports; and access of each processing element to inter-processing element busses of one server plane is independent of activity of each processing element to the independent inter-processing element busses of any other server planes.

10. A method as defined in claim 9, wherein digital data from said data server can be retrieved and delivered via said interface data ports to an external data distribution or processing medium by:

receiving, at said data server, a data selection requested by said medium;

determining the availability of a port for delivering said requested data selection to said medium;

reserving a port determined to be available;

determining the location of said requested data selection from said storage devices;

reserving the storage device containing said requested data selection; and reading said requested data selection from said reserved storage device for transmission to said medium via said reserved port.

11. A method as defined in claim 10, wherein said reserved port is released if said requested data selection cannot be located.

12. A method as defined in claim 11, wherein said storage devices comprise tape and disk storage devices and wherein said step of selecting a storage device containing said requested data selection further comprises:

determining the location of said requested data selection from said disk;

determining the location of said requested data selection from said tape if said selection is unavailable on said disk;

determining the availability of space on a disk if said selection is determined to be on said tape; and transferring the requested data from said tape to said disk.

\* \* \* \* \*